United States Patent
Sakamoto et al.

[11] Patent Number: 5,835,339
[45] Date of Patent: Nov. 10, 1998

[54] MONOLITHIC CERAMIC CAPACITOR

[75] Inventors: Norihiko Sakamoto, Shiga-ken; Harunobu Sano, Kyoto; Takaharu Miyazaki, Shiga-ken, all of Japan

[73] Assignee: Murata Manufacturing Co., Ltd., Kyoto, Japan

[21] Appl. No.: 901,221

[22] Filed: Jul. 24, 1997

[30]     Foreign Application Priority Data

| Jul. 25, 1996 | [JP] | Japan | 8-196242 |
| Apr. 14, 1997 | [JP] | Japan | 9-095615 |
| Jul. 9, 1997 | [JP] | Japan | 9-182903 |

[51] Int. Cl.[6] .............. H01G 4/005; H01G 4/06
[52] U.S. Cl. ............ 361/321.2; 361/303; 361/321.4; 361/321.5
[58] Field of Search ............... 361/303, 306.3, 361/305, 311, 312, 313, 314, 321.1, 321.2, 321.3, 321.4, 321.5, 320, 322, 330; 29/25.42; 501/134–138

[56]          References Cited

U.S. PATENT DOCUMENTS

| 5,036,425 | 7/1991 | Omori et al. | 361/321.4 |
| 5,117,326 | 5/1992 | Sano et al. | 361/321.2 |
| 5,225,960 | 7/1993 | Kishi et al. | 361/321.4 |
| 5,659,456 | 8/1997 | Sano et al. | 361/321.4 |
| 5,712,758 | 1/1998 | Amano et al. | 361/321.2 |

FOREIGN PATENT DOCUMENTS

| 2-150010 | 6/1990 | Japan | 361/321.4 |
| 6-45182 | 2/1994 | Japan | 361/321.2 |

Primary Examiner—Bot L. Ledynh
Assistant Examiner—Anthony Dinkins
Attorney, Agent, or Firm—Ostrolenk, Faber, Gerb & Soffen, LLP

[57]             ABSTRACT

A monolithic ceramic capacitor and producing method thereof are disclosed. The ceramic capacitor has a plurality of dielectric ceramic layers, a plurality of inner electrodes formed between the dielectric ceramic layers in such a manner that one end of each inner electrode is exposed out of either end of the dielectric ceramic layers, and outer electrodes electrically connected with the exposed inner electrodes; in which the inner electrodes each are made of a base metal, and Si oxide layers or layers comprising an Si oxide and at least one component that constitutes said dielectric ceramic layers and said inner electrodes are formed adjacent to the inner electrodes. The capacitor has excellent thermal impact resistance and wet load resistance characteristics.

9 Claims, 2 Drawing Sheets

5,835,339

MONOLITHIC CERAMIC CAPACITOR

FIELD OF THE INVENTION

The present invention relates to monolithic ceramic capacitors, and specifically to those having inner electrodes made of a base metal. Also, the present invention relates to a producing method of the monolithic ceramic capacitor.

BACKGROUND OF THE INVENTION

Monolithic ceramic capacitors comprising conventional dielectric ceramic compositions that consist essentially of $BaTiO_3$ were problematic in that the compositions are reduced into semiconductors if baked in neutral or reducing atmospheres having a low oxygen partial pressure. Therefore, it was necessary to use, as inner electrodes therein, noble metals, such as palladium, platinum and the like, that do not melt at temperatures at which such dielectric ceramic compositions are sintered, and that are not oxidized even when baked in atmospheres having a high oxygen partial pressure, so that such dielectric ceramic compositions can be baked without being converted into semiconductors. However, use of noble metals much interferes with the reduction in cost of the monolithic ceramic capacitors thus produced.

In order to solve the above-mentioned problems, it has been desired to use inexpensive base metals such as nickel as the material of inner electrodes. However, if such base metals are used as the material of inner electrodes and if they are baked under the conventional conditions, they are oxidized and lose their functions as electrodes. Therefore, in order to successfully use such base metals as inner electrodes, dielectric ceramic compositions having excellent dielectric characteristics are needed and which can be baked even in neutral or reducing atmospheres having a low oxygen partial pressure without making the layers of the compositions into semiconductors. As materials that meet such requirements, for example, proposed were compositions of the type of $BaTiO_3$-$CaZrO_3$-MnO-MgO, such as those disclosed in Japanese Patent Application Laid-Open No. 62-256422; compositions of the type of $BaTiO_3$-MnO-MgO-rare earth oxide, such as those in Japanese Patent Application Laid-Open No. 63-103861; compositions of the type of $BaTiO_3$-(Mg,Zn,Sr,Ca)O-$Li_2O$-$SiO_2$-MO (MO: BaO, SrO, CaO), such as those in Japanese Patent Publication No. 61-14610; and compositions of the type of (Ba,Ca,Sr,Mg,Ce)(Ti,Zr)$O_3$, such as those in Japanese Patent Application Laid-Open No. 3-263708.

However, monolithic ceramic capacitors having inner electrodes of such a base metal were problematic in that if each dielectric ceramic layer is thinned while increasing the number of the layers laminated together, some residual stress is produced at the interface between the inner electrode and the dielectric ceramic layer due to differences in contraction and also in thermal expansion between the inner electrodes and the dielectric ceramic layers, thereby worsening the thermal impact resistance of the capacitors. As to reliability in high-temperature and high-humidity conditions, which indicates so-called wet load-resisting characteristics of the capacitors, the capacitors of that type were also problematic in that such their characteristics are worsened for the same reasons as above, if each dielectric ceramic layer is thinned while increasing the number of the layers laminated.

In order to solve these problems, Japanese Patent Publication No. 7-56850 discloses monolithic ceramic capacitors in which inner electrodes of Ni are bonded to the matrix body via an aluminosilicate layer. The aluminosilicate layer is a mixture of oxides of metals such as Ni, Si and Al which originate in the inner electrode paste. Further, firing is carried out under a non-oxidative condition, e.g. 1.5% of $H_2$-98.5% of $N_2$. However, the disclosed capacitors are still problematic in that their capacitance is low, that their equivalent series resistance is large, and that, if each dielectric ceramic layer is thinned, Al added to the inner electrode paste diffuses into such thin dielectric ceramic layers, thereby worsening the characteristics of the capacitors. In addition, the thermal impact resistance of the capacitors is low.

On the other hand, Japanese Patent Application Laid-Open No. 3-133114 discloses monolithic ceramic chip capacitors in which oxide layers comprising components that are different from those constituting the dielectric layers are formed around the inner electrodes. In this, the samples are fired in atmospheres having a low oxygen concentration for the purpose of improving their reliability in high-temperature load tests. However, this baking method is ineffective in improving the thermal impact resistance and the wet load resistance of the capacitors.

In the ceramic chip capacitor, a manganese oxide layer is formed around an internal electrode. Oxides of Si/Ca/Ba/Ti/Zr/P which originate in the dielectric material may be included in the manganese oxide layer.

SUMMARY OF THE INVENTION

The object of the present invention is to improve the dielectric ceramic layers constituting a monolithic ceramic capacitor having inner electrodes of a base metal, thereby providing a monolithic ceramic capacitor having excellent thermal impact resistance and wet load resistance characteristics.

The present invention has been made in consideration of the above-mentioned object.

The present invention provides a monolithic ceramic capacitor composed of a plurality of dielectric ceramic layers, a plurality of inner electrodes formed between the dielectric ceramic layers in such a manner that one end of each inner electrode is exposed out of either end of the dielectric ceramic layers, and outer electrodes electrically connected with the exposed inner electrodes, which is characterized in that the inner electrodes each are made of a base metal and that Si oxide layers are formed adjacent to the inner electrodes.

The invention also provides a monolithic ceramic capacitor composed of a plurality of dielectric ceramic layers, a plurality of inner electrodes formed between the dielectric ceramic layers in such a manner that one end of each inner electrode is exposed out of either end of the dielectric ceramic layers, and outer electrodes electrically connected with the exposed inner electrodes, which is characterized in that the inner electrodes each are made of a base metal and that compound layers comprising an Si oxide and at least one component that constitutes said dielectric ceramic layers and said inner electrodes are formed adjacent to the inner electrodes.

In the monolithic ceramic capacitor of the invention, the base metal is preferably Ni or an Ni alloy.

In the monolithic ceramic capacitor of the invention, at least one component constituting the dielectric ceramic layers is preferably an Si oxide.

DETAILED DESCRIPTION OF THE INVENTION

Figure 1:
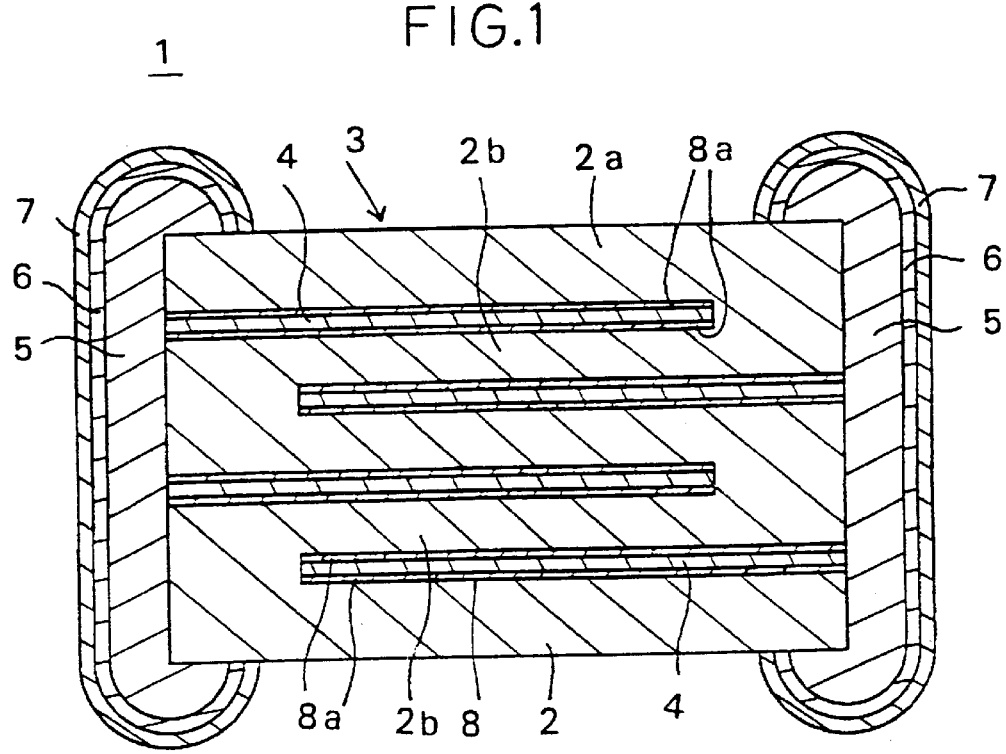
FIG. 1 is a cross-sectional view illustrating one embodiment of the monolithic ceramic capacitor of the present invention.

The monolithic ceramic capacitor of the present invention is composed of a plurality of dielectric ceramic layers, a plurality of inner electrodes formed between the dielectric ceramic layers in such a manner that one end of each inner electrode is exposed out of either end of the dielectric ceramic layers, and outer electrodes electrically connected with the exposed inner electrodes, and is characterized in that the inner electrodes each are made of a base metal and that Si oxide layers are formed adjacent to the inner electrodes. Having this constitution, the dielectric ceramic layers in the monolithic ceramic capacitor of the invention having inner electrodes of a base metal are improved, and the capacitor has excellent thermal impact resistance and wet load resistance characteristics.

Specifically, Si gathers around the inner electrodes during baking in the monolithic ceramic capacitor of the invention and can form a liquid phase therearound, resulting in that the Si oxide layers can spread over the entire surfaces of the electrodes. Accordingly, the bonding between the inner electrodes and the dielectric ceramic layers is enhanced, thereby improving the thermal impact resistance and the wet load resistance characteristics of the capacitor.

The Si oxide layers formed adjacent to the inner electrodes in the capacitor of the invention may contain deposits derived from the dielectric ceramic layers and those derived from the inner electrodes. Preferably, the Si oxide layers contain deposits derived from the dielectric ceramic layers, as they are effective in enlarging the capacitance of the capacitor and in reducing the equivalent series resistance thereof.

The composition of the dielectric ceramic layers constituting the capacitor of the present invention is not specifically defined. For example, usable herein are various dielectric ceramic compositions consisting essentially of $BaTiO_3$ or $SrTiO_3$. For the reasons mentioned above, preferably used are dielectric ceramic compositions comprising Si oxides.

The present invention also provides a monolithic ceramic capacitor which is composed of a plurality of dielectric ceramic layers, a plurality of inner electrodes formed between the dielectric ceramic layers in such a manner that one end of each inner electrode is exposed out of either end of the dielectric ceramic layers, and outer electrodes electrically connected with the exposed inner electrodes, and which is characterized in that the inner electrodes each are made of a base metal and that compound layers comprising an Si oxide and at least one component that constitutes said dielectric ceramic layers and said inner electrodes are formed adjacent to the inner electrodes. Having this constitution, the dielectric ceramic layers in the monolithic ceramic capacitor of the invention having inner electrodes of a base metal are improved, and the capacitor has excellent thermal impact resistance and wet load resistance characteristics.

In the monolithic ceramic capacitor of that type of the invention, Si also gathers around the inner electrodes during baking and can form a liquid phase therearound, resulting in that the Si-containing oxide layers can spread over the entire surfaces of the electrodes. Accordingly, the bonding between the inner electrodes and the dielectric ceramic layers is enhanced, thereby improving the thermal impact resistance and the wet load resistance characteristics of the capacitor.

The compound layers comprising an Si oxide and at least one component that constitutes the dielectric ceramic layers and the inner electrodes, which are formed adjacent to the inner electrodes in the capacitor of the invention, may be any of deposits derived from the dielectric ceramic layers and those derived from the inner electrodes. Preferably, the compound layers are deposits derived from the dielectric ceramic layers, which are effective in enlarging the capacitance of the capacitor and in reducing the equivalent series resistance thereof.

Base metals are usable to produce the inner electrodes constituting the capacitor of the invention. The composition of the base metals for use in the present invention is not specifically defined. For these, for example, concretely referred to are Ni, Ni alloys, Cu and Cu alloys. Preferred are Ni and Ni alloys, since higher sintering temperatures may be applicable to these.

The composition of the outer electrodes constituting the capacitor of the present invention is not limited. For example, the outer electrodes constituting the capacitor of the invention may be any sintered layers of electroconductive powder of Ag, Pd, Ni or the like. That is, usable herein are so-called baked electrodes. The sintered layers for the outer electrodes may comprise such electroconductive powder and glass frit of various types. The glass frit may include, for example, $B_2O_3$-$Li_2O$-$SiO_2$-BaO, $B_2O_3$-$SiO_2$-BaO, $Li_2O$-$SiO_2$-BaO, and $B_2O_3$-$SiO_2$-ZnO.

The sintered layers may be coated with a metal plate layer of, for example, Ni, Cu, Ni-Cu or the like, which may be further coated with an additional plate layer of, for example, solder, tin or the like.

Now, the present invention is described more concretely hereunder with reference to Examples, which, however, are not intended to restrict the scope of the invention.

Some embodiments of the monolithic ceramic capacitor of the present invention are shown in FIG. 1 to FIG. 4, which are cross-sectional views illustrating different embodiments of the monolithic ceramic capacitor of the invention.

As illustrated, the monolithic ceramic capacitor 1 of the invention is a rectangular parallelepiped, chip-type capacitor, which comprises a ceramic laminate 3 produced by laminating a plurality of dielectric ceramic layers 2a, 2b with an inner electrode 4 therebetween; outer electrodes 5 formed at the both ends of the ceramic laminate 3; a first plate layer 6 of nickel, copper or the like as formed on each outer electrode 5; and a second plate layer 7 of solder, tin or the like as formed on each first plate layer 6.

Now, a method for producing the monolithic ceramic capacitor 1 of the invention is described below in the order of the steps constituting the method.

First, the ceramic laminate 3 is produced as follows. A non-reducing, dielectric ceramic composition is formed into a slurry, and then sheeted to prepare dielectric ceramic layers 2 (green sheets). On one surface of each green sheet, formed is an internal electrode 4 of nickel or a nickel alloy. To form the internal electrode 4, employable is any method of screen printing, metal vapor deposition or plating.

A predetermined number of the dielectric ceramic layers 2b each with the inner electrode 4 formed thereon are laminated, and then sandwiched between two dielectric ceramic layers 2a with no inner electrode 4. Next, the thus-laminated dielectric ceramic layers 2a, 2b . . . 2b, 2a are baked in a reducing atmosphere at a predetermined temperature to give the ceramic laminate 3.

Next, on the both sides of the ceramic laminate 3, formed are two outer electrodes 5 that are connected with the inner electrodes 4. The material of the outer electrodes 5 may be the same as that of the inner electrodes 4. Apart from this, silver, palladium, silver-palladium alloys, copper, copper alloys and others can be used as the material of the outer electrodes 5. If desired, also usable are mixtures comprising a powder of such metal material and glass frit of, for example, $B_2O_3$-$SiO_2$-BaO, $Li_2O$-$SiO_2$-BaO or the like. Suitable materials are selected for the outer electrodes 5, in consideration of the use of the monolithic ceramic capacitor and the site at which the capacitor is used. The outer electrodes 5 can be formed by applying a paste material of metal powder onto the baked, ceramic laminate 3 followed by baking it. Alternatively, the paste material can be applied onto the non-baked ceramic laminate 3 and the composite. After this, the outer electrodes 5 may be plated with nickel, copper or the like to form a first plate layer 6 thereon. Last, the first plate layer 6 is coated with a second plate layer 7 of solder, tin or the like. Thus is produced the chip-type, monolithic ceramic capacitor 1.

As shown in FIG. 1 to FIG. 4, (a) Si oxide layers, or (b) compound layers comprising an Si oxide and at least one component constituting the dielectric ceramic layers and inner electrodes are formed adjacent to the inner electrodes 4, and these are in any of the conditions mentioned below. The layers (a) and (b) are hereinafter referred to as Si-containing interlayers 8.

(1) The Si-containing interlayers 8 cover almost entirely the both main surfaces of each inner electrode 4, while forming the first layers 8a that face each other across the inner electrode 4 (FIG. 1).

Figure 2:
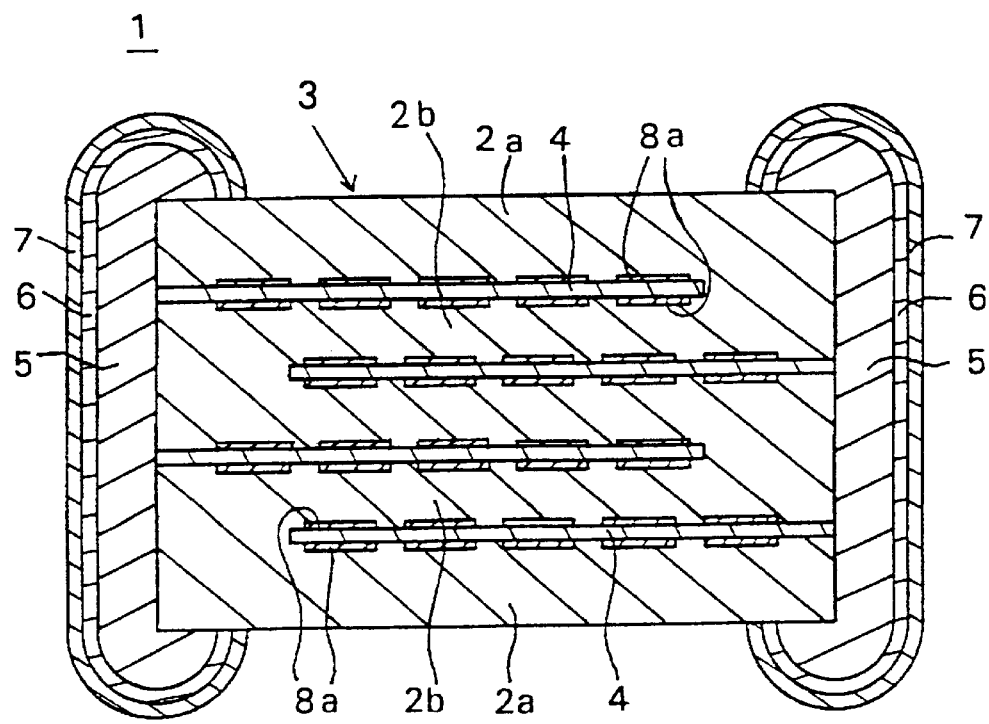
FIG. 2 is a cross-sectional view illustrating another embodiment of the monolithic ceramic capacitor of the present invention.

(2) The Si-containing interlayers 8 cover partly and randomly the both main surfaces of each inner electrode 4, while forming the first layers 8a that face each other across the inner electrode 4 (FIG. 2).

Figure 3:
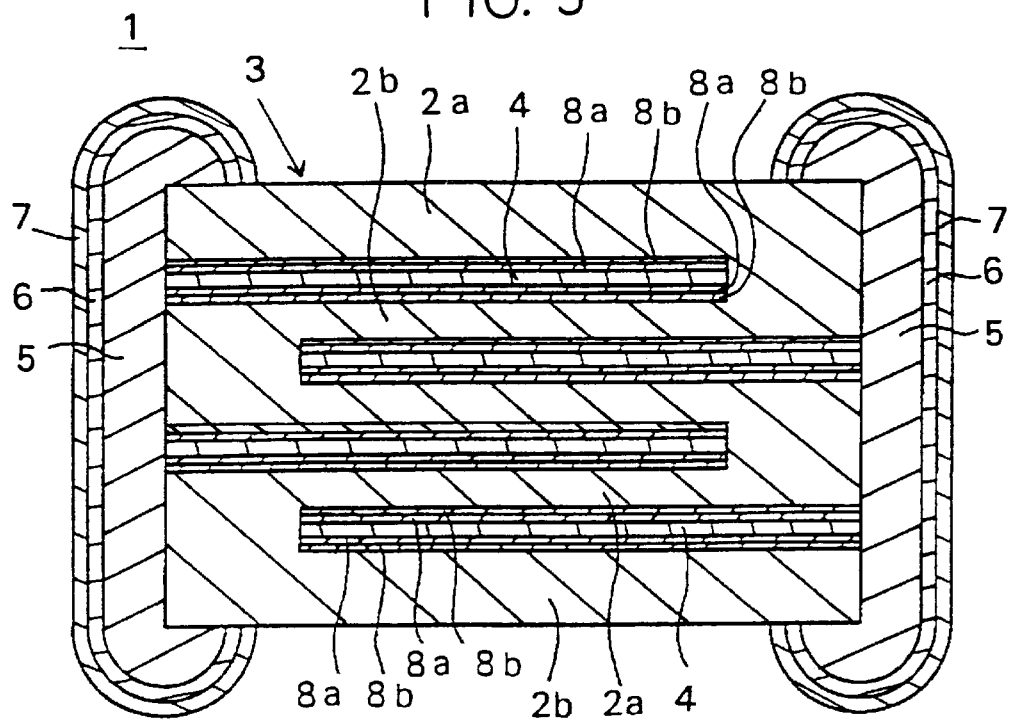
FIG. 3 is a cross-sectional view illustrating still another embodiment of the monolithic ceramic capacitor of the present invention.

(3) The Si-containing interlayers 8 cover almost entirely the both main surfaces of each inner electrode 4, while forming different first layers 8a and second layers 8b that face each other across the inner electrode 4 (FIG. 3).

Figure 4:
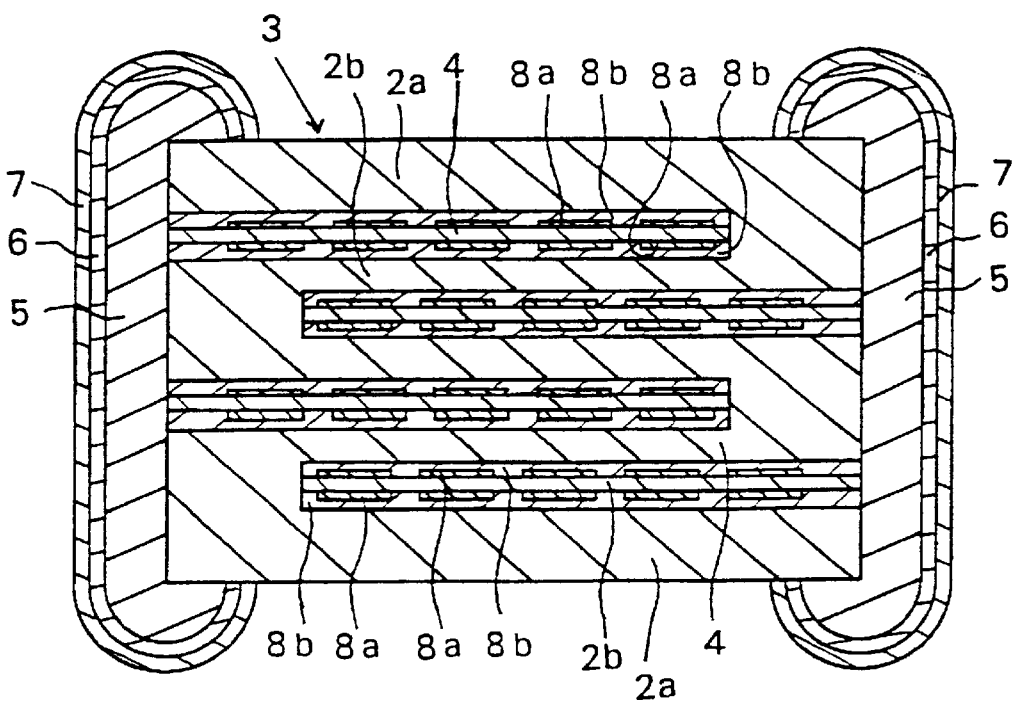
FIG. 4 is a cross-sectional view illustrating still another embodiment of the monolithic ceramic capacitor of the present invention.

(4) The Si-containing interlayers 8 cover partly and randomly the both main surfaces of each inner electrode 4, while forming the first layers 8a that face each other across the inner electrode 4 and forming the second layers 8b that cover the first layers 8a and face each other across the inner electrode 4 (FIG. 4).

Now, the constitution of the monolithic ceramic capacitor of the invention is described in more detail hereunder with reference to the following Examples.

EXAMPLE 1

First, raw materials of $TiCl_4$ and $Ba(NO_3)_2$ having various degrees of purity were prepared and weighed. These were treated with oxalic acid to obtain a precipitate of barium titanyl oxalate ($BaTiO(C_2O_4).4H_2O$). This precipitate was decomposed under heat at 1000° C. or higher to give barium titanate ($BaTiO_3$) having a molar ratio of Ba/Ti of 1.0.

Next prepared were $BaCO_3$, which is to vary the molar ratio of Ba/Ti of this barium titanate, and also $Y_2O_3$, $Dy_2O_3$, $MnCO_3$, NiO, $Co_2O_3$ and MgO, each having a purity of 99% or higher. The thus-prepared, powdery materials were formulated to give a composition consisting essentially of a main component of $97.0\{BaO\}_{1.010}TiO_2+0.7Y_2O_3+0.3Dy_2O_3+0.6MnO+0.7NiO+0.7CoO$ (as mol %) and containing 1.2 mol %, relative to said main component of (100 mol %), of MgO, to which was added 1.5 wt. %, relative to the sum of said main component and MgO of (100 wt. %), of oxide glass consisting essentially of $Li_2O$-($TiO_2.SiO_2$)-$Al_2O_3$. Next, a polyvinyl butyral binder and an organic solvent, such as ethanol or the like, were added thereto, and wet-milled in a ball mill to prepare a ceramic slurry. The resulting ceramic slurry was sheeted by doctor blading to obtain a rectangular, green sheet having a thickness of 11 μm.

Next, an electroconductive paste consisting essentially of Ni was printed on this ceramic green sheet, according to screen printing, to form thereon an electroconductive paste layer, which is formed into an inner electrode.

A plurality of these ceramic green sheets each having the electroconductive paste layer formed thereon were laminated in such a manner that the side of one sheet with the electroconductive paste exposed out of it was alternated with that of another sheet with the electroconductive paste not exposed out of it. Thus was obtained a laminate. This laminate was heated in an $N_2$ atmosphere at 350° C. whereby the binder was burnt out, and then baked in a reducing atmosphere comprising gases of $H_2$, $N_2$ and $H_2O$ under the condition indicated in Table 1. Thus were obtained herein various ceramic laminates as shown in Table 1. To bake them, the samples were kept heated at 1300° C. for 2 hours, and the heating speed and the cooling speed were both 200° C./hr.

A silver paste was applied onto the both sides of each sintered ceramic laminate, and again baked in an $N_2$ atmosphere at 600° C. to thereby form outer electrodes electrically connected with the inner electrodes.

Next, the outer electrodes were coated with an Ni plate film, which was further coated with a solder plate film.

The outer dimension of each of these monolithic ceramic capacitors thus obtained was 1.6 mm width×3.2 mm length×1.2 mm thickness, and the thickness of each dielectric ceramic layer as sandwiched between the inner electrodes was 6 μm. The total number of the effective dielectric ceramic layers was 150.

To determine the thermal impact resistance of the capacitors produced herein, 50 pieces of each sample were subjected to a thermal impact test, in which the test pieces each as pinched in a pair of tweezers were dipped in a solder tank kept at 300° C. or 325° C. for a few seconds. After having been hardened with a resin, the samples were polished and then observed with a microscope to check the presence or absence of formed cracks.

To determine the wet load resistance of the capacitors, 72 pieces of each sample were subjected to a wet load test, in which a direct current voltage of 16 V was applied to each test piece under a pressure of 2 atmospheres, at a relative humidity of 100% and at a temperature of 121° C., while measuring the insulating resistance of each test piece which varied time-dependently. In this test, the number of the tested pieces which showed an insulating resistance (R) of $10^6$ Ω or lower within a period of 250 hours and which therefore failed in this test was counted.

To confirm the presence of the Si-containing interlayers existing adjacent to the inner electrodes, each sample was subjected to EPMA analysis.

The results obtained in these tests are shown in Table 1.

TABLE 1

| Sample No. | Oxygen Pressure at 1300° C. (MPa) | Si-Containing Interlayers | Thermal Impact Test 300° C. | Thermal Impact Test 325° C. | Wet Load Test |
|---|---|---|---|---|---|
| 1-1 | $10^{-12}$ | No | 3/50 | 7/50 | 3/72 |
| 1-2 | $10^{-11}$ | No | 1/50 | 4/50 | 2/72 |
| 1-3 | $10^{-10}$ | Yes | 0/50 | 0/50 | 0/72 |
| 1-4 | $10^{-8}$ | Yes | 0/50 | 0/50 | 0/72 |
| 1-5 | $10^{-6}$ | Yes | As cracked, the sample could not be tested. | | |

In Sample No. 1-1 and Sample No. 1-2 which had been sintered in the atmosphere having an oxygen concentration of $10^{-11}$ MPa or lower, Si-containing interlayers were not formed. In Sample Nos. 1-3, 1-4 and 1-5 which had been sintered in the atmosphere having an oxygen concentration of $10^{-10}$ MPa or higher, formed were interlayers comprising oxides of Si, rare earth elements, Mn, Ni, Co and Mg around the inner electrodes, as shown in FIGS. 1 to 4. The interlayers were formed especially greatly around the inner electrodes nearest to the both main surfaces of the laminate and around the edges of the other inner electrodes. However, Sample No. 1-5 was cracked owing to oxidation of the inner electrodes, and was not worthy of being evaluated as a capacitor.

Referring to the data in the thermal resistance test and the wet load test, some of the test pieces of Sample Nos. 1-1 and 1-2, in which no Si-containing interlayers had been formed, failed in these tests while none of the test pieces of Sample Nos. 1-3 and 1-4 having Si-containing interlayers failed.

These data verify that the Si-containing interlayers formed in the capacitor samples are effective in improving the reliability of the samples in the thermal impact test and the wet load test.

The Si-containing interlayers were formed when the ceramic laminates were baked in an atmosphere having a relatively high oxygen concentration. For forming such Si-containing interlayers, it is effective to bake ceramic laminates in atmospheres having a higher oxygen concentration at higher temperatures.

The Si-containing interlayers are not limited to only those formed through baking, but could be formed through post heat-treatment after baking with no problem.

EXAMPLE 2

First, raw materials of $TiCl_4$ and $Ba(NO_3)_2$ having various degrees of purity were prepared and weighed. These were treated with oxalic acid to obtain a precipitate of barium titanyl oxalate $(BaTiO(C_2O_4).4H_2O)$. This precipitate was decomposed under heat at 1000° C. or higher to give barium titanate $(BaTiO_3)$ having a molar ratio of Ba/Ti of 1.0.

Next prepared were $Ho_2O_3$, $Co_2O_3$, $BaCO_3$, $MnCO_3$, MgO and $SiO_2$, each having a purity of 99% or higher. The thus-prepared, powdery materials were formulated to give a composition consisting essentially of a main component of 96.5$BaTiO_3$+1.5$Ho_2O_3$+2.0$Co_2O_3$ (as mol %) and containing 0.5 mol % of BaO, 1.5 mol % of MnO, 2.0 mol % of MgO and 2.0 mol % of $SiO_2$, all relative to said main component of (100 mol %). Next, a polyvinyl butyral binder and an organic solvent, such as ethanol or the like, were added thereto, and wet-milled in a ball mill to prepare a ceramic slurry. The resulting ceramic slurry was sheeted according to doctor blading to obtain a rectangular, green sheet having a thickness of 11 μm.

Next, an electroconductive paste consisting essentially of Ni was printed on this ceramic green sheet, by screen printing to form thereon an electroconductive paste layer, which is formed into an inner electrode.

A plurality of these ceramic green sheets each having the electroconductive paste layer formed thereon were laminated in such a manner that the side of one sheet with the electroconductive paste exposed out of it was alternated with that of another sheet with the electroconductive paste not exposed out of it. Thus was obtained a laminate. This laminate was heated in an $N_2$ atmosphere at 350° C. whereby the binder was burnt out, and then baked in a reducing atmosphere comprising gases of $H_2$, $N_2$ and $H_2O$ under the condition indicated in Table 2. Thus were obtained herein various ceramic laminates as shown in Table 2. To bake them, the samples were kept heated at 1300° C. for 2 hours, and the heating speed and the cooling speed were both 200° C./hr.

A silver paste was applied onto the both sides of each sintered ceramic laminate, and again baked in an $N_2$ atmosphere at 600° C. to thereby form outer electrodes as electrically connected with the inner electrodes.

Next, the outer electrodes were coated with an Ni plate film, which was further coated with a solder plate film.

The outer dimension of each of these monolithic ceramic capacitors thus obtained was 1.6 mm width×3.2 mm length× 1.2 mm thickness, and the thickness of each dielectric ceramic layer as sandwiched between the inner electrodes was 6 μm. The total number of the effective dielectric ceramic layers was 150.

To determine the thermal impact resistance of the capacitors produced herein, 50 pieces of each sample were subjected to a thermal impact test, in which the test pieces each as pinched in a pair of tweezers were dipped in a solder tank kept at 300° C. or 325° C. for a few seconds. After having been hardened with a resin, the samples were polished and then observed with a microscope to check the presence or absence of cracks formed.

To determine the wet load resistance of the capacitors, 72 pieces of each sample were subjected to a wet load test, in which a direct current voltage of 16 V was applied to each test piece under a pressure of 2 atmospheres, at a relative humidity of 100% and at a temperature of 121° C., while measuring the insulating resistance of each test piece which varied time-dependently. In this test, the number of the tested pieces which showed an insulating resistance (R) of $10^6$ Ω or lower within a period of 250 hours and which therefore failed in this test was counted.

To confirm the presence of the Si-containing interlayers existing adjacent to the inner electrodes, each sample was subjected to EPMA analysis.

The results obtained in these tests are shown in Table 2.

TABLE 2

| Sample No. | Oxygen Pressure at 1300° C. (MPa) | Si-Containing Interlayers | Thermal Impact Test 300° C. | Thermal Impact Test 325° C. | Wet Load Test |
|---|---|---|---|---|---|
| 2-1 | $10^{-12}$ | No | 4/50 | 6/50 | 5/72 |
| 2-2 | $10^{-11}$ | No | 1/50 | 3/50 | 3/72 |
| 2-3 | $10^{-10}$ | Yes | 0/50 | 0/50 | 0/72 |
| 2-4 | $10^{-8}$ | Yes | 0/50 | 0/50 | 0/72 |
| 2-5 | $10^{-6}$ | Yes | As cracked, the sample could not be tested. | | |

In Sample No. 2-1 and Sample No. 2-2 which had been sintered in the atmosphere having an oxygen concentration of $10^{-11}$ MPa or lower, Si-containing interlayers were not formed. In Sample Nos. 2-3, 2-4 and 2-5 which had been sintered in the atmosphere having an oxygen concentration of $10^{-10}$ MPa or higher, formed were interlayers comprising oxides of Si, rare earth elements, Mn, Ni, Co and Mg, as in FIGS. 1 to 4. The interlayers were formed especially greatly around the inner electrodes nearest to the both main surfaces of the laminate and around the edges of the other inner electrodes. However, Sample No. 2-5 was cracked due to oxidation of the inner electrodes, and was not worthy of being evaluated as a capacitor.

Referring to the data in the thermal resistance test and the wet load test, some of the test pieces of Sample Nos. 2-1 and 2-2, in which no Si-containing interlayers had been formed, failed in these tests; while none of the test pieces of Sample Nos. 2-3 and 2-4 having Si-containing interlayers failed.

These data verify that the Si-containing interlayers formed in the capacitor samples are effective in improving the reliability of the samples in the thermal impact test and the wet load test.

The Si-containing interlayers were formed when the ceramic laminates were baked in the atmosphere having a relatively high oxygen concentration. For forming such Si-containing interlayers, it is effective to bake ceramic laminates in atmospheres having a higher oxygen concentration at higher temperatures.

The Si-containing interlayers are not limited to only those formed through baking, but could be formed through post heat-treatment after baking with no problem.

In accordance with the examples 1 and 2, acceptable oxygen pressure ranges from about $10^{-10}$ to $10^{-8}$ MPa at 1300° C. The equilibrium oxygen partial pressure of Ni/NiO is $10^{-7.3}$ MPa at 1300° C.

From this, it is preferable that firing is carried out an oxygen pressure near or under the equilibrium oxygen partial pressure ($10^{-a}$ MPa) of M/MO (M is a metal forming an internal electrode) with the lower limit of the oxygen partial pressure being 1/1000 of the equilibrium oxygen partial pressure of M/MO.

EXAMPLE 3

Two different samples were prepared herein. One was comprised of the same main component of the dielectric ceramic composition as in Example 1 and 1.0 wt. %, relative to 100 wt. % of the dielectric ceramic composition, of the same oxide glass containing $SiO_2$ as in Example 1; while the other was comprised of only the main component of the dielectric ceramic composition but not contained the oxide glass. Using these, monolithic ceramic capacitors were formed in the same manner as in Example 1. The oxygen concentration in the baking atmosphere used herein was the same as that for the baking of Sample No. 1-4 shown in Table 1. The baking temperature for the former sample containing the oxide glass was 1300° C.; while that for the latter sample not containing the oxide glass was 1380° C. The higher temperature for the latter was to compensate for the sintering insufficiency.

To determine the thermal impact resistance of the capacitors produced herein, 50 pieces of each sample were subjected to a thermal impact test, in which the test pieces each as pinched in a pair of tweezers were dipped in a solder tank kept at 300° C. or 325° C. for a few seconds. After having been hardened with a resin, the samples were polished and then observed with a microscope to check the presence or absence of cracks formed.

To determine the wet load resistance of the capacitors, 72 pieces of each sample were subjected to a wet load test, in which a direct current voltage of 16 V was applied to each test piece under a pressure of 2 atmospheres, at a relative humidity of 100% and at a temperature of 121° C., while measuring the insulating resistance of each test piece which varied time-dependently. In this test, the number of the tested pieces which showed an insulating resistance (R) of $10^6$ Ω or lower within a period of 250 hours and which therefore failed in this test was counted.

To confirm the presence of the Si-containing interlayers existing adjacent to the inner electrodes, each sample was subjected to EPMA analysis.

The results obtained in these tests are shown in Table 3.

TABLE 3

| Sample No. | Glass Component | Si-Containing Interlayers | Thermal Impact Test 300° C. | Thermal Impact Test 325° C. | Wet Load Test |
|---|---|---|---|---|---|
| 3-1 | 1.0 wt. % added. | Yes | 0/50 | 0/50 | 0/72 |
| 3-2 | Not added. | No | 1/50 | 12/50 | 8/72 |

In Sample No. 3-1 containing the oxide glass, formed were interlayers comprising oxides of Si, rare earth elements, Mn, Ni, Co and Mg, as shown in FIGS. 1 to 4; while in Sample No. 3-2 not containing the oxide glass, no Si-containing layers were formed.

Referring to the data in the thermal resistance test and the wet load test, none of the test pieces of Sample No. 3-1 having Si-containing interlayers failed in these tests; while some of the test pieces of Sample No. 3-2, in which no Si-containing interlayers had been formed, failed in both the thermal resistance test and the wet load test.

These data verify that the Si-containing interlayers formed in the sample are effective in improving the reliability of the sample in the thermal impact test and the wet load test.

The Si-containing interlayers were formed when the ceramic laminate was baked in the atmosphere having a relatively high oxygen concentration. For forming such Si-containing interlayers, it is effective to bake ceramic laminates in atmospheres having a higher oxygen concentration at higher temperatures.

The Si-containing interlayers are not limited to only those formed through baking, but could be formed through post heat-treatment after baking with no problem.

As having Si-containing interlayers around the interfaces between the inner electrodes of a base metal and the dielectric ceramic layers, the monolithic ceramic capacitor of the present invention has better thermal impact resistance and wet load resistance characteristics than any other conventional ones.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor composed of
   at least three dielectric ceramic layers,
   at least two inner electrodes formed between adjacent ones of said dielectric ceramic layers in such a manner that one end of each said inner electrode is exposed at a different end of said dielectric ceramic layer, and
   outer electrodes electrically connected with the exposed inner electrode ends,
   the monolithic ceramic capacitor being characterized in that
   the inner electrodes are made of a base metal, and have a layer comprising Si oxide adjacent thereto.

2. The monolithic ceramic capacitor as claimed in claim 1, wherein the layer comprising Si oxide contains at least one component of said dielectric ceramic layers or said inner electrodes.

3. The monolithic ceramic capacitor as claimed in claim 2, wherein said base metal is Ni or an Ni alloy.

4. The monolithic ceramic capacitor as claimed in claim 3, wherein the layer comprising Si oxide covers substantially all of the surfaces of each of said inner electrodes.

5. The monolithic ceramic capacitor as claimed in claim 3, wherein the layer comprising Si oxide discontinuously covers the surfaces of at least one of said inner electrodes.

6. The monolithic ceramic capacitor as claimed in claim 2, wherein said base metal is Ni or an Ni alloy.

7. The monolithic ceramic capacitor as claimed in claim 1, wherein said base metal is Ni or an Ni alloy.

8. The monolithic ceramic capacitor as claimed in claim 1, wherein the layer comprising Si oxide covers substantially all of the surfaces of each of said inner electrodes.

9. The monolithic ceramic capacitor as claimed in claim 1, wherein the layer comprising Si oxide discontinuously covers the surfaces of at least one of said inner electrodes.

* * * * *